United States Patent
Hoyt, III et al.

[19]

[11] Patent Number: 6,019,684

[45] Date of Patent: *Feb. 1, 2000

[54] COMPACT FLEXIBLE COUPLINGS WITH IMPROVED LOCK-ON FEATURES

[76] Inventors: Raymond E. Hoyt, III, 26602 Via Gaviota, Mission Viejo, Calif. 92691; Jerry L. Hauck, 504 Huval St., Broussard, La. 70518; Tom Artunian, 16291 Sundance La., Huntington Beach, Calif. 92649

[ * ] Notice: This patent is subject to a terminal disclaimer.

[21] Appl. No.: 08/955,516

[22] Filed: Oct. 21, 1997

Related U.S. Application Data

[63] Continuation-in-part of application No. 08/742,372, Nov. 1, 1996, which is a continuation of application No. 08/693,568, Aug. 7, 1996, abandoned, which is a continuation of application No. 08/321,516, Oct. 12, 1994, abandoned.

[51] Int. Cl.[7] ........................................... F16D 3/54
[52] U.S. Cl. ............................ 464/88; 464/154; 464/901
[58] Field of Search ................................. 464/73, 74, 75, 464/76, 87, 88, 149, 153, 154, 173, 901

[56] References Cited

U.S. PATENT DOCUMENTS

| | | |
|---|---|---|
| 99,742 | 2/1870 | Zwiebel .................................. 464/153 |
| 1,328,366 | 1/1920 | Brown . |
| 1,622,101 | 3/1927 | Francke . |
| 1,952,232 | 3/1934 | Axien . |
| 2,092,704 | 9/1937 | Ricefield .................................. 464/76 |
| 2,213,277 | 9/1940 | Guy . |
| 2,301,659 | 11/1942 | Ricefield . |
| 2,337,287 | 12/1943 | Williams . |
| 2,343,839 | 6/1944 | Austin . |
| 2,502,790 | 4/1950 | Jencick . |
| 2,629,991 | 3/1953 | Guy . |
| 2,655,798 | 10/1953 | Neher . |
| 2,740,271 | 4/1956 | Beller . |
| 2,859,599 | 11/1958 | Case . |
| 2,867,102 | 1/1959 | Williams . |
| 2,867,103 | 1/1959 | Williams . |
| 2,924,082 | 2/1960 | Reich . |
| 3,313,124 | 4/1967 | Filepp . |
| 3,362,191 | 1/1968 | Louette ................................. 464/88 X |
| 3,410,112 | 11/1968 | Gawreliuk . |
| 3,729,953 | 5/1973 | Wanzer . |
| 4,176,815 | 12/1979 | Davidson et al. .................. 403/349 X |
| 5,139,460 | 8/1992 | Hoyt, III et al. . |
| 5,186,197 | 2/1993 | Lavine ................................ 403/349 X |
| 5,657,525 | 8/1997 | Hoyt, III et al. .......................... 464/88 |
| 5,738,585 | 4/1998 | Hoyt, III et al. .......................... 464/88 |

FOREIGN PATENT DOCUMENTS

| | | |
|---|---|---|
| 1325728 | 1/1994 | Canada . |
| 839967 | 6/1938 | France . |
| 2678033 | 12/1992 | France . |
| 1046417 | 12/1958 | Germany . |
| 2042260 | 8/1970 | Germany . |
| 97473 | 5/1973 | Germany . |
| 12610 | 11/1933 | United Kingdom . |
| 459909 | 1/1937 | United Kingdom . |

OTHER PUBLICATIONS

Catalog entitled, "Mechanical Power Transmission Equiptment," by T.B. Woods Sons Company.
Formsprag, Elastomeric Couplings, Hi Missalighnment Capacity Overload Protection PTS–093–90.
Atra–Flex Catalog showing prior art couplings.

*Primary Examiner*—Eileen D Lillis
*Attorney, Agent, or Firm*—Price Gess & Ubell

[57] ABSTRACT

A flexible coupling having hubs secured to aligned shafts and connected to one another through the use of a flexible belt surrounding the hubs is improved by forming axial and circumferential grooves on the exterior surface of the belt, each circumferential groove lying transverse to and opening into an axial groove. A cooperating metal retainer band has respective pins formed on its interior surface for insertion into the axial grooves and rotation into the circumferential grooves, thereby fixing the retainer band in position with respect to the flexible belt and coupling. Retention of the retainer band pin within the circumferential groove is insured by displacing the center line of the axial groove from a plane perpendicularly bisecting an underlying projection of the flexible belt and by lengthening the circumferential groove.

24 Claims, 3 Drawing Sheets

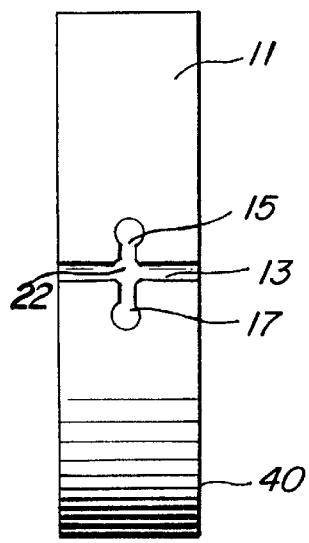
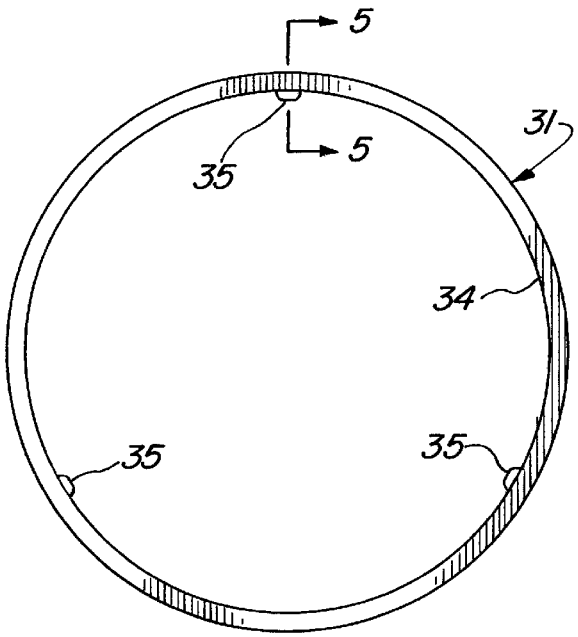
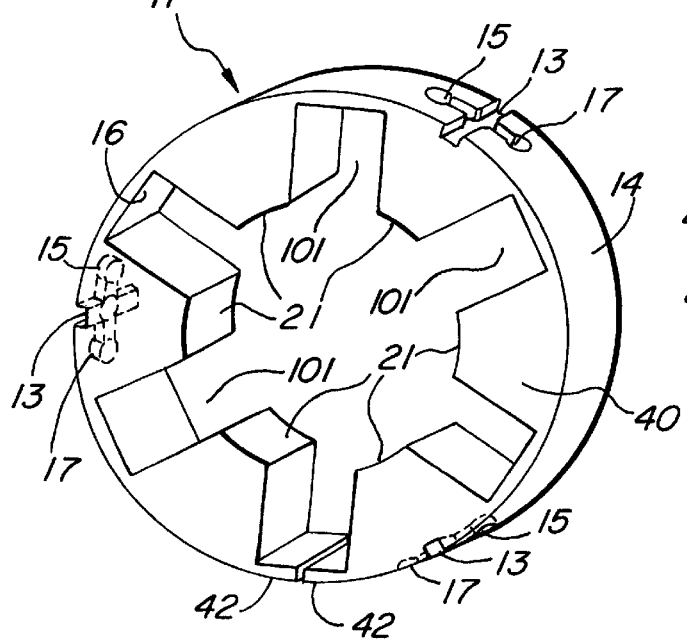
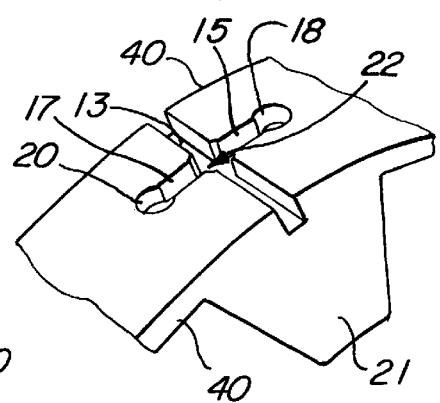
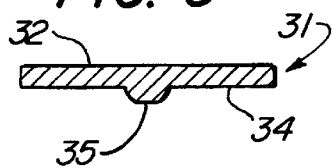

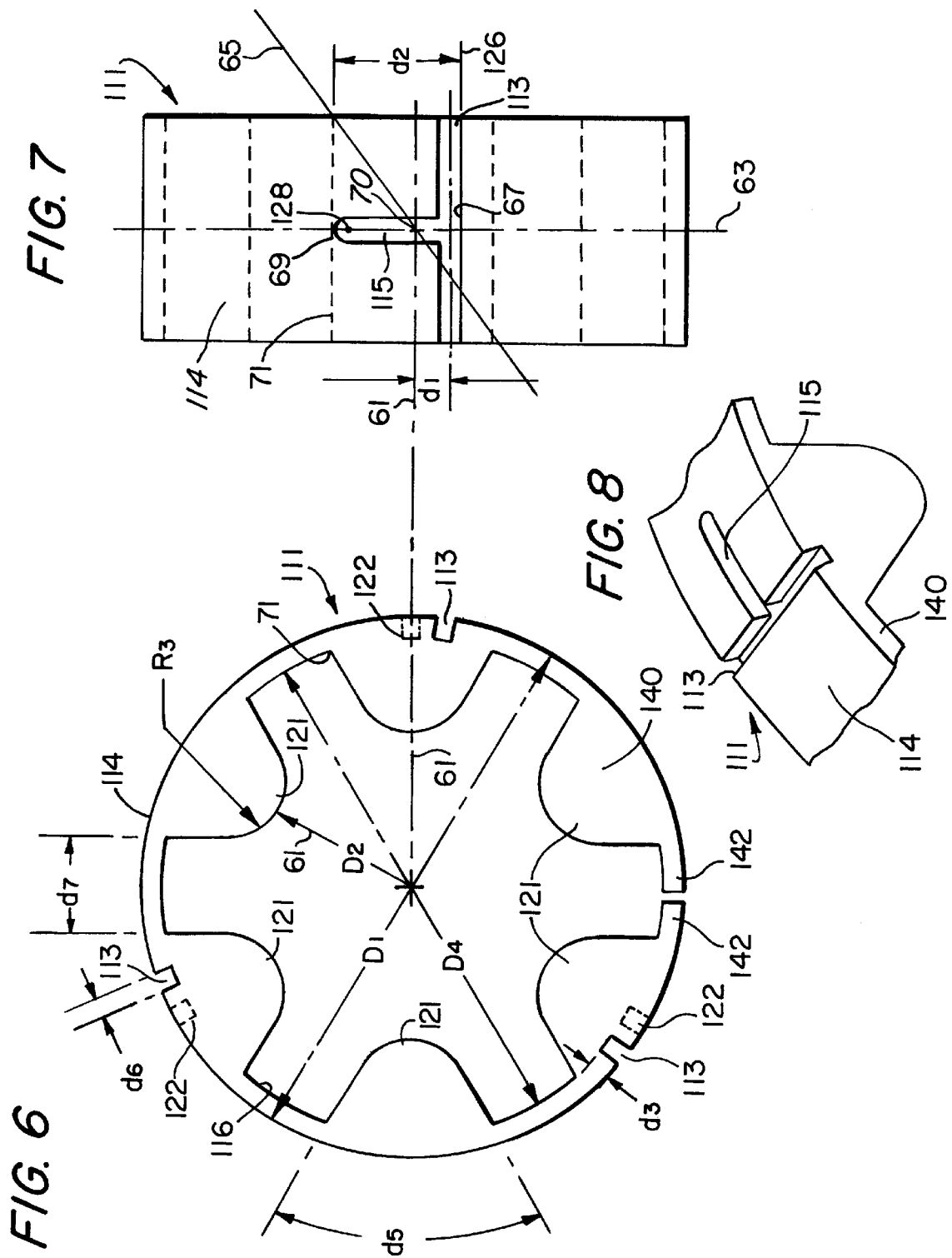

COMPACT FLEXIBLE COUPLINGS WITH IMPROVED LOCK-ON FEATURES

This application is a continuation-in-part of application Ser. No. 08/742,372 filed Nov. 1, 1996, which is a continuation of application Ser. No. 08/693,568 filed Aug. 7, 1996, which is a continuation of application Ser. No. 08/321,516 filed Oct. 12, 1994. applications 08/693,568 and 08/321,516 are now abandoned.

BACKGROUND OF THE INVENTION

1. Field of the Invention

The invention set forth in this specification pertains to new and improved flexible couplings and, more particularly, to such couplings having an improved walk-off, gross misalignment detection and lock-on feature.

2. Description of Related Art

Flexible couplings have probably been used since shortly after the advent of the modern machine age for the purpose of transmitting rotation from one shaft to another. Such couplings are normally used in order to accommodate comparatively minor shaft alignment problems such as are occasionally encountered because of manufacturing or assembly errors. Because of the fact that these devices are widely used and have been known and used for many years, many different types of flexible couplings have been proposed, built, and used.

The particular flexible couplings of the type to which this invention pertains have been manufactured in the past so as to include two hubs or hub elements which are adapted to be connected to the shafts joined by the coupling. These hubs are each provided with extending lugs, teeth, or ribs serving as holding means so as to be engaged by corresponding projections on a band-like or belt-like motion transmitting means in order to cause the hubs to rotate in synchronism as one of the shafts is rotated. The bands or belts used in these prior couplings have been flexible, somewhat resilient belts capable of being wrapped around the hubs so that the projections on them engage the holding means on the hubs.

A metal band or ring is typically used to retain the belt in position wrapped around the hubs. The interior of the band is shaped and dimensioned so that the band may be slid axially relative to the hubs during the assembly and disassembly of the coupling so that the band fits over the belt when the coupling is assembled so as to conform closely to the exterior of the belt.

Some coupling designs have provided a pair of oppositely-disposed axial grooves in the outer surface of the belt and a pair of oppositely-disposed pins in the inner surface of the metal band. The pins are located so as to slide into the grooves as the metal band is installed along a line parallel to the axis of rotation of the hubs. The pins thus position the band and provide a degree of retention. However, if the shafts are grossly misaligned, the metal band will "walk-off" the belt, causing the coupling to come apart. The axial grooves have also been provided with an enlarged central portion such that the pins must be forced through the entrance of the axial groove and then "pop" into place in the central portion to give a tactile indication that the metal band is properly positioned with respect to the flexible belt.

In our U.S. patent applications, Ser. Nos. 08/742,372 and 08/695,675 (now U.S. Pat. No. 5,738,585), we have disclosed an improved "lock-on" apparatus for improving the retention of the aforementioned metal retainer bands. This improved apparatus employs an axial groove for initially receiving a pin located on the underside of the metal retainer band and a circumferential groove opening into the axial groove and into which the retainer band pin may be rotated. In the embodiments illustrated in the referenced applications, the axial groove is bisected by a radial line which also bisects one of the lobes or projections of the flexible belt. The circumferential groove is relatively short, typically having been selected to be two times the width of the retainer ring pin. In practice, such apparatus must contend with vibrations, harmonics, rotation, misalignment and various stresses and forces on the component parts.

OBJECTS AND SUMMARY OF THE INVENTION

Experience has shown that in some cases the improved lock-on apparatus of our prior applications may not perform as desired in the face of the rigors of operation. Applicants have discovered that the problem behind such cases is due to a combination of the flexure imparted to the flexible belt and the location and dimensioning of the grooves which tend to permit the retainer band pin to escape the circumferential groove.

According to one aspect of the invention, Applicants have moved the axial groove off the radial bisector of the flexible belt projection and, according to another aspect, additionally extended the length of the circumferential groove so as to provide a groove structure which prevents the pin from escaping when the coupling is subjected to its maximum torque rating. In the preferred design, the open end or "mouth" of the circumferential groove will lie past a maximum expected "line of flexure" corresponding to the maximum torque rating. In this manner, the retainer band pin will be retained by the circumferential groove despite various flexures of the belt accompanying torque transmission. It is thus apparent that it is an object of the invention to improve flexible couplings and a still further object to provide an improved axial/circumferential groove structure for providing secure locking of retainer bands onto flexible belts of such structures.

The improved lock-on structure according to the invention is entirely compatible with the improved coupling design and installation method featuring a two-step installation procedure described in U.S. Pat. No. 5,657,525. According to this procedure, a cooperating metal retainer band is first installed on the flexible belt with a cooperating pin or pins lying in the axial groove or grooves. The coupling is then rotated under operating conditions to determine if there is gross misalignment; i.e., if the retainer band rotates off the belt. If not, the retainer band is rotated such that the pins become located or positioned in the transverse circumferential grooves, thus fixing the retainer band in position such that it cannot slide axially with respect to the belt.

BRIEF DESCRIPTION OF THE DRAWINGS

The just-summarized invention will now be more fully explained with reference to the accompanying drawings, of which:

FIG. 1 is a side perspective view of a flexible belt in accordance with a prior embodiment;

FIG. 2 is a front view of the flexible coupling belt of FIG. 1;

FIG. 3 is a partial perspective view of a segment of the belt of FIGS. 1 and 2;

FIG. 4 is a side view of a ring or retainer band for cooperative installation with the belt of FIGS. 1–3, according to the preferred embodiment;

FIG. 5 is a cross-sectional view taken at 5—5 of FIG. 4;

FIG. 6 is a side perspective view of a flexible belt in accordance with the preferred embodiment;

FIG. 7 is a front view of a flexible coupling belt of FIG. 1;

FIG. 8 is a partial perspective view of a segment of the belt of FIGS. 6 and 7;

Figure 9:
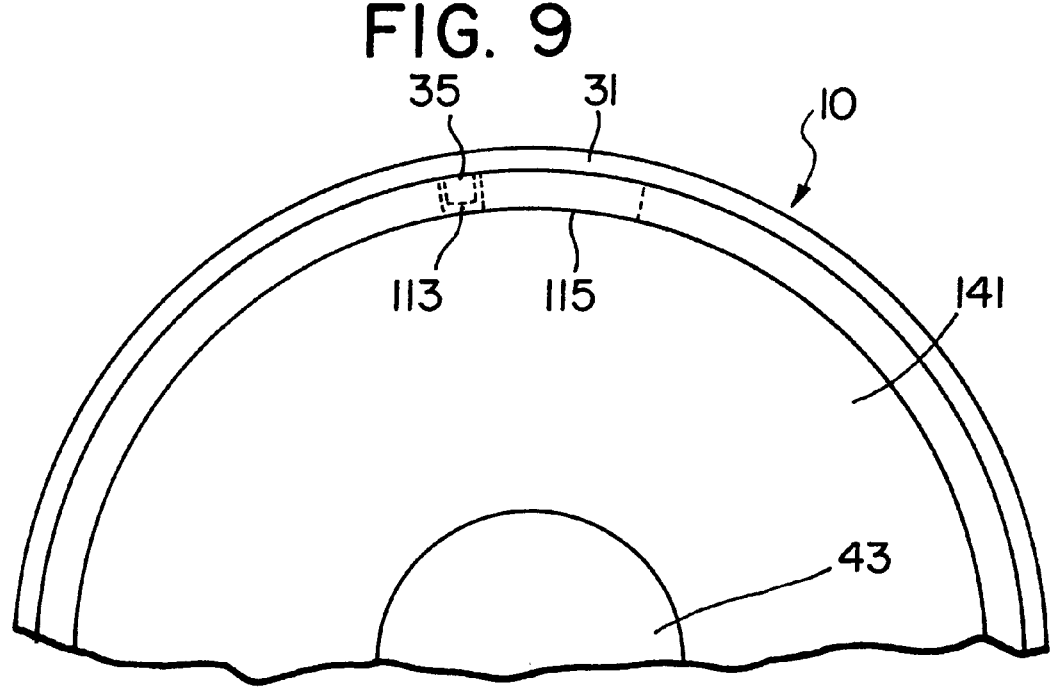
FIGS. 9 and 10 are partial side views of a flexible coupling illustrating the manner of installing a retainer ring and flexible belt thereon, according to the preferred embodiment.

The particular couplings illustrated in the accompanying drawings are constructed so as to embody the concepts and teachings of this invention summarized and defined in the appended claims. Since these concepts and features may be utilized in a variety of somewhat differently appearing flexible couplings through the use of ordinary mechanical engineering skill on the basis of the disclosure embodied in this specification and the accompanying drawings, the invention is not to be considered as being limited to the precise structures illustrated in the drawings and described herein.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a cooperating coupling belt and ring structure, as well as an overall coupling structure, which is particularly effective in operation, as well as readily manufactured and installed.

FIGS. 1–3 illustrate a flexible belt 11 according to the embodiment disclosed in our prior application. This belt 11 is preferably formed out of a somewhat flexible, somewhat resilient material capable of transmitting a significant rotational force from one hub of a flexible coupling to the other during the use of the coupling. Presently preferred results are achieved by forming the belt 11 out of an appropriate polyurethane having the rotational force transmitting properties indicated. It has been found that a urethane material is particularly desirable because it will give or flex sufficiently to accommodate minor misalignment of rotating shafts without affecting its ability to be utilized over a long period.

As formed, the belt 11 has a generally cylindrical exterior 14, an interior 16, sides or side edges 40, and ends 42 (FIG. 2). The belt 11 will normally be just sufficiently long so that the ends 42 will not quite meet when the belt 11 is located around a pair of hubs. When the belt 11 is in this position, truncated wedge-shaped projections 21 on its interior 16 extend between cooperating teeth on the hubs so as to fit closely with respect to all of the teeth, as known in the art. The projections 21 can be considered as interior engagement means on the belt 11 which are employed for the purpose of engaging the hub teeth so as to transmit rotation from one of the hubs to the other of the hubs.

The belt 11 further has axially-disposed grooves or channels 13 in its exterior surface 14. The illustrated embodiment has three such grooves 13 located at equal intervals around the circumference of the exterior surface 14 of the belt 11, i.e. 120 degrees apart.

At the center of the belt 11, the side of each channel or groove 13 is provided with a respective circumferential groove, channel, or notch 15, 17, each positioned perpendicular to and opening into groove 13. The grooves 13, 15, 17 are all preferably rectangular in cross-section and have a common flat floor; i.e., they are of the same depth. The grooves 13, 15, 17 are all further of a width which permits them to slidingly receive respective pins 35 of a cooperating metal ring or band 31 illustrated in FIGS. 4 and 5.

As those skilled in the art will appreciate, the metal band 31 is used to retain the flexible belt 11. As shown in FIG. 5, the metal band 31 includes an interior surface 34 and an exterior surface 32. The interior 34 of the band 31 as well as the pins 35 located thereon, are shaped and dimensioned so that the band 31 may be slid axially relative to the hubs, such as hub 41, during the assembly and disassembly of a coupling so that the band 31 fits over the belt 11, as shown, so as to conform closely to the exterior 14 of the belt 11 when the belt 11 is installed. The pins 35 are centered on the interior surface 34 of the metal band 31 and equally spaced apart about the circumference of this interior surface 34 at intervals of 120 degrees.

Each circumferential groove 15, 17 terminates in an end receptacle 18, 20. The end receptacle 18, 20 is somewhat wider than the entrance pathway to it. Similarly, the central portion 22 at the intersection of the axial groove 13 with the circumferential grooves 15, 17 is somewhat larger than the entrance pathways to the central portion 22 provided in the channel 13 and also somewhat larger than the entrance pathways of the respective grooves 15, 17. Central portion 22 thereby forms a third receptacle.

As indicated in FIG. 1, for example, each of the receptacle portions 18, 20, 22 may be generally contoured in cross-section to match an identical circle.

The entrance pathways to the receptacle portions 18, 20, 22 are preferably slightly narrower than the width of the pins 35 such that one feels resistance as the band 31 is forced onto the belt 11. The receptacles 18, 20, 22 (and, hence, the "circle" in FIG. 1) are dimensioned slightly larger to receive and hold one of the pins 35 of the metal band 31, such that one feels the resistance cease as the pins 35 pop into place in any of the receptacle portions 18, 20, 22. Since the pins 35 are not visible during installation, such structure and operation provides a tactile indication of proper positioning of the pins 35.

Representative dimensioning for an entranceway is 0.154 inch for a pin width of 0.184 inch and a receptacle diameter of 0.185 inch. Such dimensioning may, of course, vary as the size of the coupling, ring, and belt vary.

FIGS. 6–8 illustrate a flexible belt 111 according to the preferred embodiment of the subject invention. This belt 111 is again preferably formed out of a somewhat flexible, somewhat resilient material capable of transmitting a significant rotational force from one hub of a flexible coupling to the other during the use of the coupling. Presently preferred results are achieved by forming the belt 111 out of an appropriate polyurethane having the rotational force transmitting properties indicated. It has been found that a urethane material is particularly desirable because it will give or flex sufficiently to accommodate minor misalignment of rotating shafts without affecting its ability to be utilized over a long period.

As formed, the belt 111 has a generally cylindrical exterior 114, an interior 116, sides or side edges 140, and ends 142 (FIG. 6). The belt 111 will normally be just sufficiently long so that the ends 142 will not quite meet when the belt 111 is located around a pair of hubs, e.g. 141 (FIG. 9). When the belt 111 is in this position, projections or lobes 121 on its interior 116 extend between cooperating teeth on the hubs, e.g. 141, so as to fit closely with respect to all of the teeth. Such projections are shown rounded in FIG. 6, but may be truncated or rounded, as shown, for example, in FIG. 2 and also in U.S. Pat. No. 5,738,585, incorporated by reference herein. The projections 121 can be considered as interior engagement means on the belt 111 which are employed for the purpose of engaging the hub teeth so as to transmit rotation from one of the hubs to the other of the hubs.

The belt 111 further has axially-disposed grooves or channels 113 in its exterior surface 114. The illustrated embodiment has three such grooves 113 located at equal intervals around the circumference of the exterior surface 114 of the belt 111, i.e., 120 degrees apart.

According to our prior application, such axial grooves 13 were centered on the radial bisectors 61 of the projections or lobes 21, as illustrated by phantom grooves 122 in FIG. 6. According to the preferred embodiment of FIGS. 6 and 7, each axial groove 113 is centered on a line 126 which is moved a distance "$d_1$" from the bisector 61, as shown in FIG. 7. It may be noted that bisector 61 may be considered to be a line defined by a plane bisecting a projection 121 and lying perpendicular to the plane of the paper.

At the center of the outer surface 114 of the belt 111, the side of each channel or groove 113 is provided with a respective circumferential groove, channel, or notch 115, each located on a line 63 bisecting the outer surface 114 and positioned perpendicular to and opening into a respective groove 113. The grooves 113, 115, are all preferably rectangular in cross-section and have a common flat floor; i.e., they are of the same depth. The grooves 113, 115, are all further of a width which permits them to slidingly receive respective pins 35 of a cooperating metal retainer band or ring 31 illustrated in FIGS. 4 and 5.

As further shown in FIG. 7, the circumferential groove 115 is selected to be of a length which will not permit a retainer band pin 35 to escape when the belt 111 experiences the degree of flexure imparted when the belt 111 is subjected to its maximum torque rating. In FIG. 7, prevention of escape of the pin 35 due to such flexure is ensured by locating the semicircular end 69 of the circumferential groove 115 at a distance "$d_2$" from the end of the most distant wall 67 of the axial groove. As may be appreciated, point 128 is the center of the semicircular end 69 of the circumferential groove 115. The end 69 of the circumferential groove 115 lies tangent to hidden line 71 and thus lies over and preferably should not be extended past the end of the underlying lobe 121.

FIG. 7 further illustrates a diagonal line or "flexure line 65" which represents a degree of twisting of the belt 111 which occurs when maximum torque is applied to belt. This flexure line 65 lies near the center point 70 of the lobe 121 and the circumferential grooves of prior art designs opened into it, a factor motivating moving of the axial groove 113 off the center point 70 of the lobe 121 and lengthening the circumferential groove 115 to extend to the end 71 of the lobe 121. In practice, the circumferential grooves 115 might not necessarily need to extend to the line 71 at the end of the lobe 121, but it is preferred to do so to provide as much security as possible in the retention of the retainer pin 35.

Maximum torque ratings are familiar to those skilled in the art. As an example, the maximum torque rating of the M1 series coupling manufactured by ATR Sales, Inc. is 2100 inch lbs. Maximum torque ratings can be determined from tests of the couplings using a static torque twist machine for smaller sized couplings. The machine will apply a given torque and measure the degree of twist in relationship to torque applied. Those skilled in the art are familiar with angles which can be tolerated without causing axial thrust loads on the rotating equipment.

Figure 10:
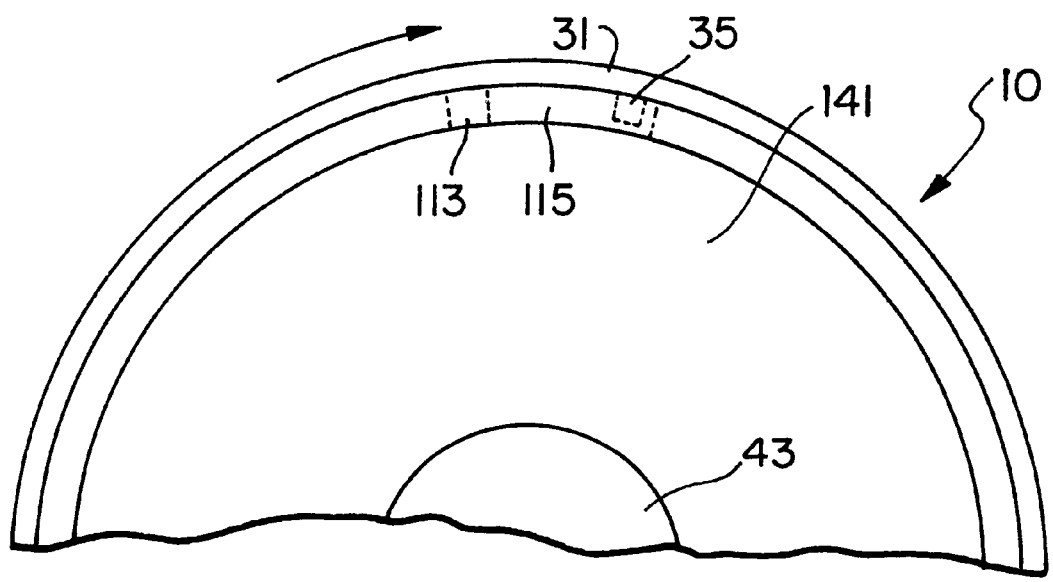

As will be appreciated from the foregoing discussion, the retainer band 31 of FIG. 4 is used to retain the flexible belt 111. The retainer band 31 is conventionally constructed of metal, but could be fabricated of other materials exhibiting similar properties. The interior 34 of the retainer band 31, as well as the pins 35 located thereon, are shaped and dimensioned so that the band 31 may be slid axially relative to the hubs 41 during the assembly and disassembly of the coupling 10 so that the band 31 fits over the belt 111, as shown, so as to conform closely to the exterior 114 of the belt 111 when the belt 111 is installed as illustrated in FIGS. 9 and 10. The pins 35 are centered on the interior surface 34 of the retainer band 31 and equally spaced apart about the circumference of this interior surface 34 at intervals of 120 degrees.

As may be seen in FIGS. 7 and 8, only one circumferential groove 115 is employed in the presently preferred embodiment and it terminates in an end receptacle terminating at semicircular end 69. The end receptacle may be somewhat wider than the entrance pathway to it, if desired, but is not so widened in the presently preferred embodiment, i.e., just a simple "notch" is used. Other details of the receptacle structure of FIG. 3 may be added as desired in various embodiments.

An example of dimensioning in inches for a coupling belt constructed according to FIG. 6 is as follows:

| | | | |
|---|---|---|---|
| $d_1$: | .125 | Outside Diameter ($D_1$): | 3.470 |
| $d_2$: | .587 | Inside Diameter ($D_2$): | 1.975 |
| $d_3$: | .175 | Radius ($R_3$) (lobe radius): | .370 |
| $d_5$: | 1.06075 | Diameter ($D_4$): | 3.210 |
| $d_6$: | .125 | | |
| $d_7$: | .620 | | |

The dimensions $d_3$, $d_5$, $d_6$ and $d_7$ respectively represent (a) a thickness of the web portion of belt 111; (b) the length of an arc at the widest part of a lobe 121; (c) the width of an axial groove 113; and (d) the width of the spoke receptacle formed between a pair of lobes 121.

Representative dimensioning for an entranceway is 0.154 inch for a pin width of 0.184 inch and a receptacle diameter of 0.185 inch. Such dimensioning may, of course, vary, for example, as the size of the coupling, ring 31, and belt 11 vary.

As known in the art, flexible couplings 10 are normally utilized to mechanically connect two aligned or substantially aligned shafts, e.g., 43 (FIGS. 9, 10). The couplings 10 include two separate, identical cylindrical hubs, e.g., 141. Such hubs are typically provided with centrally-located shaft openings which accommodate respective shafts, e.g., 43. Such hubs may be secured to the shafts through the use of conventional set screws or in other conventional manners well-known in the field. Normally, the precise methods of securing the hubs to the shafts will be dependent upon the size of the coupling and the sizes of the shaft with which it is to be used. If desired, the two openings in the two hubs may differ in dimension so as to accommodate shafts of a different dimension.

When the hubs are mounted they are desirably either in axial alignment or are nearly in axial alignment, and they are located on their respective shafts so that projecting teeth or lugs located on their adjacent ends extend generally towards one another. These teeth will normally be spaced a short distance axially from one another so as to avoid their periodically abutting against one another in the event the respective shafts are not in precise alignment.

During installation of the coupling 10, the teeth on the adjacent ends of the hubs will be brought into alignment with one another, as known in the art, through the rotation of one or the other of the shafts as a belt 11 serving as a motion transmitting means is assembled on the hubs, e.g. 141.

According to the preferred embodiment, a two-step procedure is then used to install the metal band 31 on the belt 111 and, hence, on the coupling 10. First, the band 31 is positioned adjacent the belt 111 with each pin 35 aligned with a respective axial groove 113. The band 31 is then forced onto the belt 11, thereby locating each pin 35 in its respective groove 115, as illustrated in FIG. 9. The coupling 10 is then rotated by supplying driving power to a selected shaft 43. While the coupling 10 is operating, e.g. at normal speed, it is observed to determine whether the band 31 will slide or "walk" off the belt 111. If so, there is an indication that the respective coupling shafts are grossly misaligned, and the shafts may then be properly aligned until the metal band 31 does not walk off.

After proper shaft alignment, the metal band 31 is then rotated, —clockwise in FIG. 9, about the shaft axis so as to position each pin 31 at point 128 of a respective transverse circumferential groove, e.g., 115, thereby fixing the metal band 31 in position on the flexible belt 11.

Those skilled in the art will appreciate that various adaptations and modifications of the just-described preferred embodiment can be configured without departing from the scope and spirit of the invention. For example, while receptacles 18, 20, 22 may be used to enhance installation and provide tactile sensing of the relative band/belt position, such receptacle portions can be modified or omitted. The number of axial and cooperating circumferential grooves may also be varied. Various diameter or "sizes" of hubs and belts may be provided for various applications with various specific dimensioning for a selected application. The hubs and belts may have various forms and may interface via truncated projections, rounded projections with inside diameter belt support or in other manners. Therefore, it is to be understood that, within the scope of the appended claims, the invention may be practiced other than as specifically described herein.

What is claimed is:

1. Flexible coupling apparatus comprising:
a split, flexible belt having an outer surface and a plurality of interior openings defining a plurality of interior projections, at least one of said projections having a side profile which is symmetrical about a radial plane bisecting said at least one projection;
an endless retainer band means for retaining said flexible belt in position and having an interior surface and a pin located on said interior surface;
at least one axial groove formed in the outer surface of said belt, said axial groove being positioned, and having a width selected, to receive and permit axial passage of said pin, said axial groove lying on a center line spaced apart from a line defined by the intersection of said plane and the outer surface of said belt; and
at least one circumferential groove formed in the outer surface of said belt perpendicular to said axial groove and opening into said axial groove and having a width selected to receive and permit circumferential passage of said pin.

2. The coupling apparatus of claim 1 wherein said circumferential groove is of a length selected to prevent escape of said pin when said belt is subjected to torque equal to a maximum torque rating.

3. The coupling apparatus of claim 1 wherein said at least one axial groove includes an entrance pathway portion and a receptacle portion.

4. The coupling apparatus of claim 3 wherein said entrance pathway portion is dimensioned to provide resistance to insertion of said pin therein and said receptacle portion is dimensioned to reduce said resistance, thereby providing a tactile sense of insertion of said pin in said receptacle portion.

5. The flexible coupling apparatus of claim 1 further including a second circumferential groove opening into said axial groove and disposed opposite said at least one circumferential groove, said second circumferential groove being of a width selected to permit passage of said pin.

6. The flexible coupling apparatus of claim 1, wherein said retainer band means has three equally circumferentially spaced pins and said belt has three axial grooves positioned and dimensioned to permit passage of a respective one of said pins and three circumferential grooves, each opening into a respective one of said axial grooves and having a width selected to permit passage of a selected one of said pins.

7. The flexible coupling apparatus of claim 6 wherein said axial grooves are equally spaced about the circumference of the belt 120 degrees apart.

8. The flexible coupling apparatus of claim 6 further including three additional circumferential grooves, each additional circumferential groove opening into a respective one of said axial grooves and having a width selected to permit passage of a selected one of said pins.

9. In a flexible coupling, the apparatus comprising:
a split, flexible belt having an outer surface;
an endless retainer band means for retaining said flexible belt in position in said apparatus, said retainer band means having an interior surface and a pin located on said interior surface;
at least one axial groove means formed in the outer surface of said belt and positioned for receiving said pin in response to axial application of said retainer band means about said belt and for holding said pin in a first position; and
at least one circumferential groove means formed in the outer surface of said belt perpendicular to said axial groove means and opening into said axial groove means for receiving said pin in response to circumferential rotation of said pin away from said first position and for thereafter resisting axial movement of said pin, said circumferential groove means further being of a length selected for preventing said pin from exiting said circumferential groove means when said flexible belt is subjected to flexure during operation.

10. The apparatus of claim 9 wherein said length is selected to prevent said pin from exiting said circumferential groove means when said flexible belt is subjected to flexure corresponding to application of torque to said coupling equal at least to the maximum torque rating of said coupling.

11. The coupling apparatus of claim 10 wherein said at least one axial groove means includes an entrance pathway portion and a receptacle portion.

12. The apparatus of claim 11 wherein said entrance pathway portion is dimensioned to provide resistance to insertion of said pin therein and said receptacle portion is dimensioned to reduce said resistance, thereby providing a tactile sense of insertion of said pin in said receptacle portion.

13. The apparatus of claim 10 further including a second circumferential groove means opening into said axial groove means and disposed opposite said at least one circumferential groove means for permitting passage of said pin.

14. The apparatus of claim 10, wherein said retainer band means has three equally circumferentially spaced pins and said belt has three axial groove means positioned for receiving and permitting passage of a respective one of said pins and three circumferential groove means, each opening into a respective one of said axial groove means for receiving and permitting passage of a respective one of said pins.

15. The apparatus of claim 14 wherein said three axial groove means are equally spaced from one another about the circumference of the belt 120 degrees apart.

16. The apparatus of claim 10 wherein said flexible belt has a plurality of interior openings defining a plurality of interior projections, at least one of said projections having a side profile which is symmetrical about a radial plane bisecting said at least one projection, said axial groove means lying on a center line spaced apart from a line defined by the intersection of said plane and the outer surface of said belt.

17. The apparatus of claim 9 wherein said flexible belt has a plurality of interior openings defining a plurality of interior projections, at least one of said projections having a side profile which is symmetrical about a radial plane bisecting said at least one projection, said axial groove means lying on a center line spaced apart from a line defined by the intersection of said plane and the outer surface of said belt.

18. Flexible coupling apparatus comprising:
   a split, flexible belt having an outer surface and a plurality of interior openings defining a plurality of interior projections, at least one of said projections having a side profile which is symmetrical about a radial plane bisecting said at least one projection;
   an endless retainer band means for retaining said flexible belt in position and having an interior surface and a pin located on said interior surface;
   at least one axial groove formed in the outer surface of said belt positioned, and having a width selected, to receive and permit axial passage of said pin, said axial groove lying on a center line spaced apart from a line defined by the intersection of said plane and the outer surface of said belt; and
   at least one circumferential groove formed in the outer surface of said belt perpendicular to said axial groove and opening into said axial groove and having a width selected to receive and permit circumferential passage of said pin, said circumferential groove having an open end and a closed end, the closed end being located adjacent to an end of said at least one projection.

19. Flexible coupling apparatus comprising:
   a flexible belt having an outer surface and a plurality of interior openings defining a plurality of interior projections, at least one of said projections having a side profile which is symmetrical about a radial plane bisecting said at least one projection;
   an endless retainer band sized to retain said flexible belt in position and having an interior surface and a pin located on said interior surface;
   at least one axial groove formed in the outer surface of said belt, said axial groove being positioned, and having a width selected, to receive and permit axial passage of said pin, said axial groove lying on a center line spaced apart from a line defined by the intersection of said plane and the outer surface of said belt; and
   at least one circumferential groove formed in the outer surface of said belt perpendicular to said axial groove and opening into said axial groove and having a width selected to receive and permit circumferential passage of said pin.

20. The coupling apparatus of claim 19 wherein said circumferential groove is of a length selected to prevent escape of said pin when said belt is subjected to torque equal to a maximum torque rating.

21. The coupling apparatus of claim 19 wherein said circumferential groove is of a length selected for preventing said pin from exiting said circumferential groove when said flexible belt is subjected to flexure during operation.

22. The coupling apparatus of claim 19 wherein said circumferential groove has an open end and a closed end, the closed end being located adjacent to an end of said at least one projection.

23. In a flexible coupling, the apparatus comprising:
   a flexible belt having an outer surface;
   an endless retainer band sized to retain said flexible belt in position in said apparatus, said retainer band having an interior surface and a pin located on said interior surface;
   at least one axial groove formed in the outer surface of said belt and positioned for receiving said pin in response to axial application of said retainer band about said belt and for holding said pin in a first position; and
   at least one circumferential groove formed in the outer surface of said belt perpendicular to said axial groove and opening into said axial groove for receiving said pin in response to circumferential rotation of said pin away from said first position and for thereafter resisting axial movement of said pin, said circumferential groove further being of a length selected for preventing said pin from exiting said circumferential groove when said flexible belt is subjected to flexure during operation.

24. The apparatus of claim 23 wherein said length is selected to prevent said pin from exiting said circumferential groove when said flexible belt is subjected to flexure corresponding to application of torque to said coupling equal at least to the maximum torque rating of said coupling.

* * * * *